United States Patent
Elford et al.

(10) Patent No.: US 10,338,334 B2
(45) Date of Patent: Jul. 2, 2019

(54) SYSTEM AND METHOD FOR DIRECT CABLE EXPANSION

(71) Applicant: CenturyLink Intellectual Property LLC, Denver, CO (US)

(72) Inventors: Michael L. Elford, Calhoun, LA (US); Pete A. Kawamoto, Littleton, CO (US); Diana L. Unser, Lakewood, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 167 days.

(21) Appl. No.: 15/669,467

(22) Filed: Aug. 4, 2017

(65) Prior Publication Data
US 2018/0039040 A1     Feb. 8, 2018

Related U.S. Application Data

(60) Provisional application No. 62/371,646, filed on Aug. 5, 2016, provisional application No. 62/410,688, filed on Oct. 20, 2016.

(51) Int. Cl.
| | |
|---|---|
| *B63B 35/03* | (2006.01) |
| *G02B 6/44* | (2006.01) |
| *H02G 1/00* | (2006.01) |
| *H02G 1/08* | (2006.01) |

(52) U.S. Cl.
CPC ......... *G02B 6/4463* (2013.01); *G02B 6/4465* (2013.01); *G02B 6/4471* (2013.01); *G02B 6/4483* (2013.01); *G02B 6/4485* (2013.01); *G02B 6/4495* (2013.01); *H02G 1/00* (2013.01); *H02G 1/086* (2013.01); *G02B 6/4416* (2013.01)

(58) Field of Classification Search
USPC ..... 254/134.3 R, 134.4, 134.5; 29/33 F, 762, 29/870
See application file for complete search history.

(56) References Cited

U.S. PATENT DOCUMENTS

| | | | |
|---|---|---|---|
| 2,827,264 A | | 3/1958 | Sitton |
| 4,403,667 A | | 9/1983 | Reichman |
| 4,519,462 A | | 3/1985 | Kelley |
| 5,096,000 A | * | 3/1992 | Hesse ............... E21B 4/145 |
| | | | 175/171 |
| 5,639,183 A | | 6/1997 | Griffioen |
| 6,824,329 B2 | | 11/2004 | van Bijsterveld |
| 7,814,654 B2 | * | 10/2010 | Pichler ............... H02G 1/08 |
| | | | 29/33 F |
| 7,967,530 B2 | | 6/2011 | Mayhew |
| (Continued) | | | |

FOREIGN PATENT DOCUMENTS

DE     10-2011-087642 A1    6/2013

*Primary Examiner* — Joseph J Hail
*Assistant Examiner* — Shantese L McDonald

(57) ABSTRACT

Novel tools and techniques for direct cable expansion are provided. A system includes a pump, a probe, and a coupler. The pump is coupled to a reservoir holding a fluid. The probe is in fluid communication with the pump, and is configured to introduce the fluid into a cable such that a channel is created, by the fluid, between an outer sheath of the cable and a core of the cable. The coupler is configured to attach to a cable, receive the probe, and position the probe at an interface between the outer sheath and an inner material of the cable adjacent to the outer sheath.

20 Claims, 7 Drawing Sheets

(56) References Cited

U.S. PATENT DOCUMENTS

| | | |
|---|---|---|
| 9,651,167 B2 | 5/2017 | Harr |
| 2003/0012606 A1 | 1/2003 | van Bijsterveld |
| 2004/0067108 A1 | 4/2004 | Bayer |
| 2007/0119283 A1 | 5/2007 | Wurm |
| 2016/0372902 A1* | 12/2016 | Nusbaum ............. H02G 1/1275 |
| 2017/0085065 A1 | 3/2017 | Fitzgerald |
| 2018/0041017 A1 | 2/2018 | Elford et al. |
| 2018/0115141 A1 | 4/2018 | Elford et al. |

* cited by examiner

SYSTEM AND METHOD FOR DIRECT CABLE EXPANSION

CROSS REFERENCE TO RELATED APPLICATIONS

This application claims priority to U.S. Provisional Patent Application Ser. No. 62/371,646, filed Aug. 5, 2016 by Michael L. Elford et al., entitled, "DCEP—Direct Cable Expansion Project to Insert Fiber;" and U.S. Provisional Patent Application Ser. No. 62/410,688, filed Oct. 20, 2016 by Michael L. Elford et al., entitled "DCEP—Direct Cable Expansion Project (Injection Process)."

This application may be related to U.S. Provisional Patent Application Ser. No. 62/371,647, filed Aug. 5, 2016 by Michael L. Elford et al., entitled, "DCBP—Direct Cable Buried Project to Place Fiber;" U.S. Provisional Patent Application Ser. No. 62/410,691 filed Oct. 20, 2016 by Michael Elford et al., entitled "DCBP—Direct Cable Buried Project (Boring Process);" and U.S. Provisional Patent Application Ser. No. 62/410,696 filed Oct. 20, 2016 by Michael Elford et al., entitled "DCAPP—Direct Cable Applied Physical Process."

The respective disclosures of these applications/patents (which this document refers to collectively as the "Related Applications") are incorporated herein by reference in their entirety for all purposes

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to telecommunication cables and physical transmission mediums, and more particularly to tools and techniques for the installation of telecommunication cables in relation to existing cables.

BACKGROUND

Copper wire cabling has historically been used as a transmission medium for telecommunications. Copper cables, such as twisted pair cabling, traditionally used in telecommunications offer limited data bandwidth, and are also limited by the distances over which signals need to be carried in modern telecommunications. As demand for bandwidth and transmission speed increases, the use of existing copper cables has been replaced by other transmission media, such as optical fiber.

Typically, telecommunication lines are buried. Thus, to install new cable or replace existing copper cable, cost and labor-intensive processes are used. This may involve excavation and trenching of roads, residential areas, and other areas where the cable will be buried.

Accordingly, tools and techniques for the installation of new cables through the expansion of existing cables are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
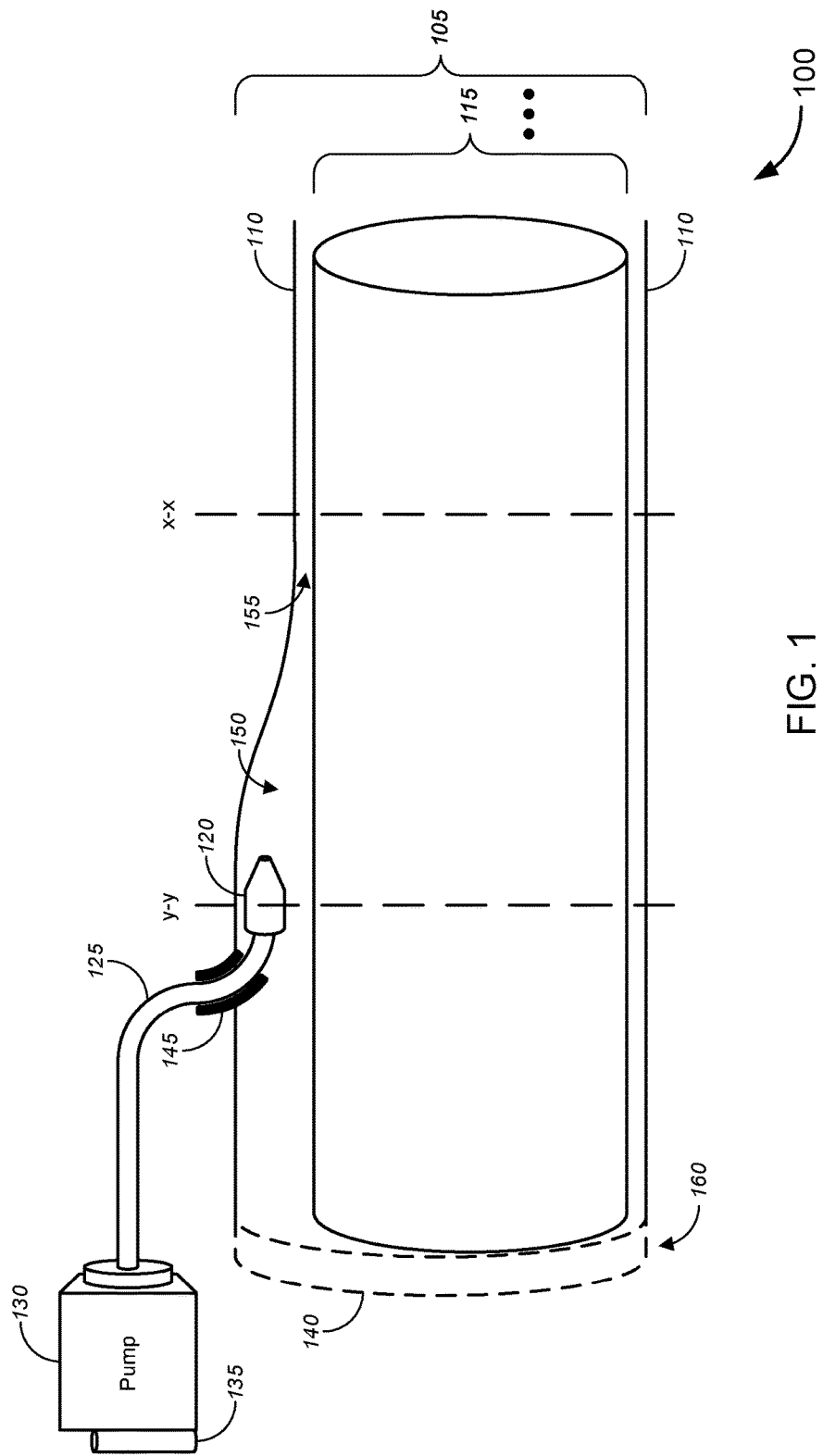
FIG. 1 is a schematic illustration of a system for direct cable expansion, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a system for direct cable expansion is provided. The system includes a pump, a probe, and a coupler. The pump may be coupled to a reservoir holding a fluid, and configured to pump the fluid. A probe may be operatively coupled to the pump, and configured to introduce the fluid into a cable such that a channel is created, by the fluid, between an outer sheath of the cable and a core of the cable. The coupler may be configured to attach to the cable at a first end, receive the probe, and position the probe at an interface between the outer sheath and an inner material of the cable adjacent to the outer sheath.

In another aspect, an apparatus for direct cable expansion is provided. The apparatus includes a probe and a coupler. The probe may be in fluid communication with a pump, and configured to introduce a fluid into a cable such that a channel is created, by the fluid, between an outer sheath of the cable and a core within the cable. The coupler may be configured to attach to the cable, receive the probe, and position the probe at an interface between the outer sheath and an inner material of the cable adjacent to the outer sheath.

In a further aspect, a method of direct cable expansion is provided. The method may begin by attaching a coupler to a cable, and receiving, via the coupler, a probe. The probe may be positioned, via the coupler, at an interface between the outer sheath and an inner material of the cable adjacent to the outer sheath. Fluid may then be introduced, via one of the coupler or the probe, into the interface between the outer sheath and the inner material, wherein a channel is created by the fluid, between the outer sheath and a core within the cable.

FIG. 1 is a schematic illustration of a system 100 for direct cable expansion. According to various embodiments, the system 100 includes a cable 105 with an outer sheath 110, and core 115, a probe 120, hose 125, pump 130, reservoir 135, endcap 140, coupler 145, and channel 150. It should be noted that the components of the system 100 are schematically illustrated in FIG. 1, and that a variety of hardware configurations are possible in accordance with various embodiments.

In the embodiments depicted, the coupler 145 may be coupled to the cable 105 via the outer sheath 110. The coupler 145 may be configured to allow the probe 120 and/or hose 125 to enter inside the cable 105, between the outer sheath 110 and core 115. The probe 120 may be coupled to pump 130 via the hose 125, and the pump 130 may be in fluid communication with reservoir 135. Endcap 140 may be operatively coupled to at least one end of the cable 105.

In various embodiments, cable 105 may include an outer sheath 110 and core 115. The cable 105 may include any type of cable, buried or otherwise, such as those used for electrical transmission and telecommunications. Types of cable may include, without limitation, copper cables, telephone cables, twisted pair cables, and optical fiber cables, among others. In some further embodiments, the cable 105 may further include a housing configured to carry one or more sub-cables. For example, housings may include, without limitation, ducts (e.g., innerducts), and cable conduits.

The outer sheath 110 of the cable 105 may act to hold together (e.g., house) one or more wires, conductors, optical fibers, or other transmission lines of the core 115. The outer sheath 110 may further serve as a protective cover to physically protect the cable from damage and wear due to movement, vibration, weather, moisture, and the surrounding environment including soil, dust, sand, gravel, and water. Accordingly, the outer sheath 110 may include, without limitation, tubes, sleeves, shielding, and jackets surrounding the one or more wires, conductors, optical fibers, or other transmission lines of the core 115.

The core 115 may include one or more types of transmission media located inside or otherwise housed by the outer sheath 110. In some embodiments, the core 115 may be a single conductor, wire, optical fiber, or other transmission line. For example, the core 115 may be a single copper conductor core. In other embodiments, the core 115 may include multiple conductors, wires, optical fibers, cables, and/or other transmission lines of the same type, such as, for example multiple copper wire twisted pair cables. Alternatively, the core 115 may include multiple transmission lines of different types. For example, the core 115 may include one or more copper wire twisted pair cables, and one or more copper wires for power delivery. Accordingly, the core 115 may include one or more transmission lines of one or more transmission media types. In various embodiments, the cable 105 and/or core 115 may further include, in addition to the transmission lines, any associated insulation, shielding, cladding, buffering, or other inner material located adjacent to the interior of the outer sheath 110.

Accordingly, the outer sheath 110 may be configured to provide protection to the core 115 against physical stresses and the environment around the cable 105. Suitable materials for the outer sheath 110 may include, without limitation, rubber, thermoplastics such as polyvinyl chloride (PVC), polyurethane (PU), acrylonitrile butadiene styrene (ABS), polycarbonate (PC), polyethylene (PE), polypropylene (PP), and other plastics.

The outer sheath 110 may, therefore, be expandable utilizing, without limitation, heat, pressure, or physical deformation (e.g., stress, strain, stretching, etc.). In various embodiments, the outer sheath 110 may be expandable from inside the cable 105. In some embodiments, expansion of the outer sheath 110 of the cable 105 may cause the formation of a channel 150 within the cable 105, by utilizing the probe 120 and pump 130.

In various embodiments, the channel 150 may include a volume co-extending longitudinally with the core 115. The channel 150 may be formed to create spacing at an interface 155 between the outer sheath 110 and the core 115. In some embodiments, this may include the boundary between the outer sheath 110 and an inner material of the cable 105, which may form part of the core 115 or be separate from the core 115. In some embodiments, the interface 155 may include where the outer sheath 110, and core 115 (including inner material), meet. Accordingly, the interface 155 may extend circumferentially around the core 115, including points where the outer sheath 110 is in physical contact with the core 115. In other embodiments, the interface 155 may include areas between the outer sheath 110 and core 115 in which the outer sheath 110 and core 115 may be enlarged or separated to create the channel 150. In such configurations, the outer sheath 110 and core 115 may not be in physical contact, but the interface 155 may still be enlarged to create the channel 150.

In some embodiments, the channel 150 may be formed such that separation between the outer sheath 110 and core 115 occurs over at least part of interface 155. In further embodiments, the channel 150 may be formed over the entire interface 155, thus creating a channel 150 that extends circumferentially around the entirety of the core 115.

Accordingly, in various embodiments, the channel 150 may be created utilizing the probe 120 and pump 130. The probe 120 may be coupled to the pump 130 via the hose 125. The probe 120 may be configured to be actuated by fluid pumped by the pump 130. When positioned at the interface 155 between the outer sheath 110 and core 115, the probe 120 may be actuated to create the channel 150. In some embodiments, the probe may create the channel 150 by introducing (e.g. injecting, pumping, directing, etc.) the fluid inside of the cable 105. In further embodiments, in addition to introducing the fluid inside of the cable, the probe 120 may be configured to enlarge the channel 150 via separate mechanical operation of the probe 120, whether actuated by the fluid from the pump 130, or via electrical power. For example, the probe 120 may include, without limitation, nozzles, fluid outlets, spray heads, and tool heads, such as pneumatic tools, drills, moles, impact tools, or spreaders.

In some embodiments, the probe 120 may further be configured to advance through the channel 150, as it is being created, to lengthen or otherwise further expand the channel 150. This may be accomplished through one or more actions, including, without limitation, introduction of the fluid, mechanical operation of the probe 120, or mechanically feeding the hose 125 into the channel 150.

In various embodiments, the pump 130 may include, without limitation, any type of pump or compressor, configured to compress and transport the fluid, via the hose 125, to the probe 120. For example, the pump 130 may include, without limitation, various positive displacement pumps and/or gas compressors. In some embodiments, the pump 130 may be coupled to reservoir 135 holding the fluid to be pumped. The fluid may include gases, liquids, or both gases and liquids, that are configured to pressurize an environment inside of the cable 105 to cause separation between the outer sheath 110 and the core 115 at the interface 155. In some embodiments, the fluid may further be configured to act as one or more of a lubricant, coolant, or a solvent. Accordingly, suitable fluids may include, without limitation, pressurized air, nitrogen, carbon dioxide, argon, steam, water (in liquid form), mineral oil, other industrial hydraulic fluids and lubricants as known to those skilled in the art, or a combination different types of fluids.

Accordingly, in an alternative embodiment, the probe 120 may be configured to create channel 150 by dissolving at least part of core 115, by introducing a fluid that is a solvent. The fluid may be introduced to the interface 155 between the outer sheath 110 and the core. The fluid (e.g., solvent) may be configured to dissolve at least part of the inner material of the cable 105 and/or core 115 without dissolving the outer sheath 110 and any transmission lines within the core 115. For example, in some embodiments, the fluid may be configured to dissolve a cladding material surrounding one or more transmission lines of the core 115, while not affecting the outer sheath or the one or more transmission lines. Thus, the channel 150 may be formed within the cladding material of the core 115. The channel 150 may be formed separate from, or in combination with, expansion of the outer sheath 110 by the probe 120 via introduction of the fluid.

In various embodiments, the probe 120 may be coupled to the cable 105 via a coupler 145. The coupler 145 may be configured to receive the probe 120, and to position the probe 120 at the interface 155 between the outer sheath 110 and the core 115. The coupler 145 may include various types of connectors, attachments, couplers, valves, fittings, taps, or a combination of such components. More specifically, types of couplers 145 may include, without limitation, hydraulic couplers, pneumatic couplers, quick release couplers, and hose couplers, among others. In some embodiments, the coupler 145 may be configured to allow the probe 120 and/or hose 125 to advance into and retract out of the channel 150. In further embodiments, the coupler 145 may include a guide to accommodate movement of the hose 125 into and out of the channel 150. The guide may include, without limitation, one or more bearings (e.g., ball bearings, roller bearings, etc.), pulleys, or tracks.

In some embodiments, the coupler 145 may be configured to tap into the outer sheath 110 from outside of the outer sheath 110. The coupler 145 may be configured to seal the fluid within the channel 150, and to prevent the fluid from leaking out from any opening created in the outer sheath 110 by tapping into the outer sheath 110 by the coupler 145. In further embodiments, the coupler 145 may be configured to prevent dirt, soil, dust, gravel, or other materials from entering the cable 105. Accordingly, the coupler 145 may include, without limitation, boots, guards, gaskets, grommets, or other mechanical seals. In yet further embodiments, the coupler 145 may be configured to be sealed after the probe 120 and hose 125 have been removed, and a new cable (e.g., one or more new transmission lines, cables, or conduits) has been installed into the channel 150. Thus, the coupler 145 may be configured to maintain a seal around any opening created in the outer sheath 110, and to seal any opening in the coupler 145 through which the probe 120 and/or hose 125 passes through. For example, coupler 145 may include, without limitation, a threaded hole, lip, grove, or other receiving mechanism to which a lid, or sealing cap may be attached.

In some embodiments, an endcap 140 may optionally be used to create a seal preventing fluid from leaking out of an end 160 of the cable 105. For example, in certain embodiments, the outer sheath 110 may be opened or removed, at end 160, leaving the core 115 exposed. Thus, the endcap 140 may be required to keep the fluid within the channel 150 of cable 105. Accordingly, endcap 140 may include any cap that may be affixed to the end 160 of the cable 105 to form a liquid-proof or airproof seal at end 160 of the cable 105. In other embodiments, the coupler 145 may be configured to attach to the end 160 of the cable 105, thereby creating a seal at the end 160 of the cable 105.

In some alternative configurations, the system 100 may include two or more sets of couplers 145 and probes 120. For example, in some embodiments, a first coupler 145 may be placed in proximity to one end (e.g., end 160) of the cable 105, and a second coupler 145 may be placed in proximity to the other end of the cable 105. The probes 120 may then be configured to create respective channels 150 from each respective end of the cable 105, enlarging the channels 150 towards each other until the channels 150 join centrally between the two ends of the cable 105.

Figure 2A:
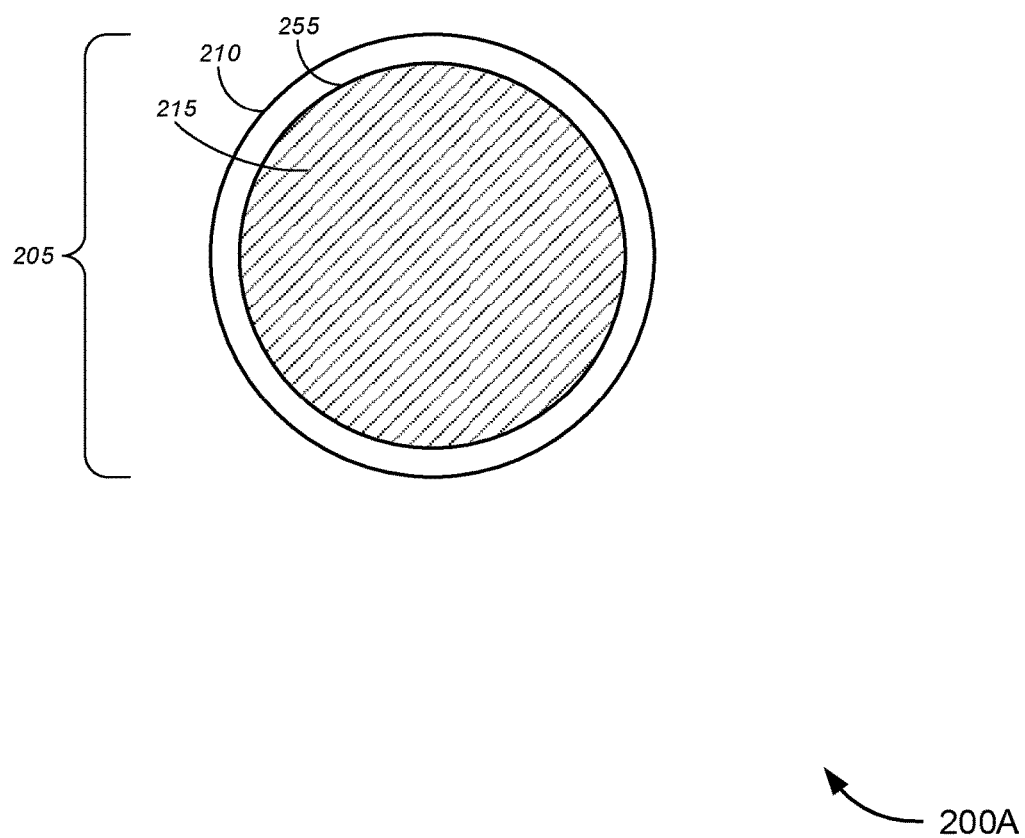
FIG. 2A is a cross-sectional view of an existing cable, in accordance with various embodiments.
Figure 2B:
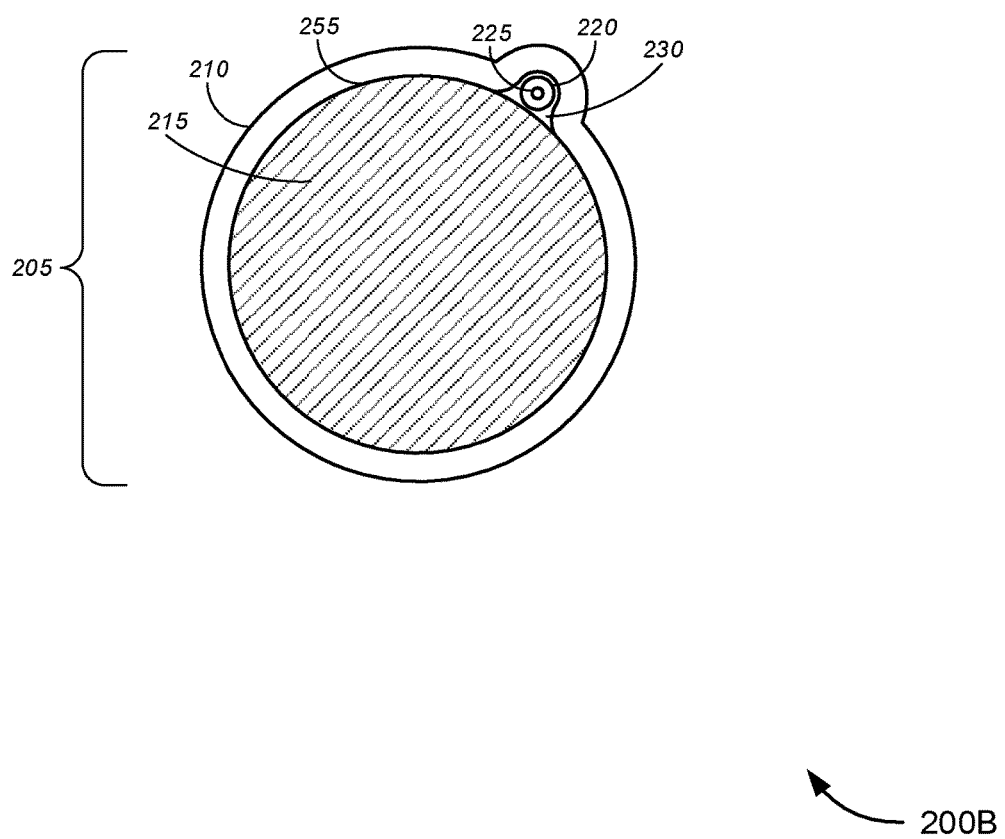
FIG. 2B is a cross-sectional view of an existing cable undergoing direct cable expansion, in accordance with various embodiments.
Figure 3:
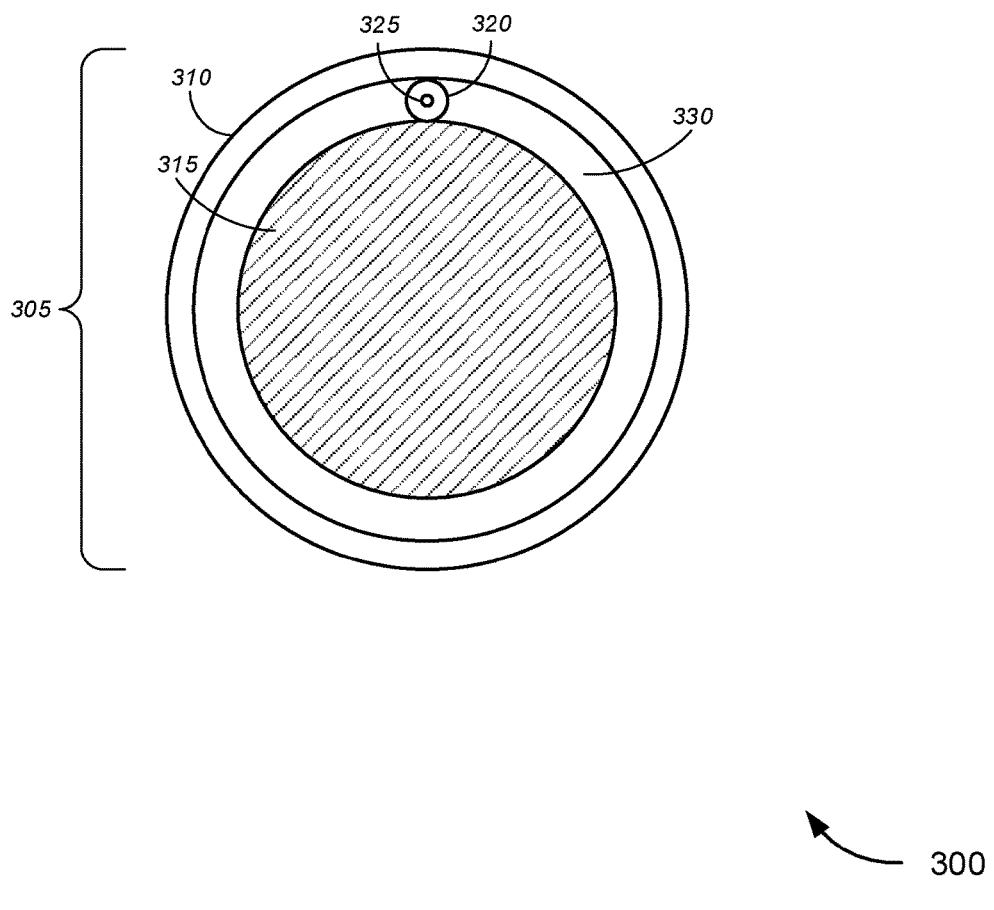
FIG. 3 is a cross-sectional view of an existing cable undergoing an alternative process for direct cable expansion, in accordance with various embodiments.
Figure 4:
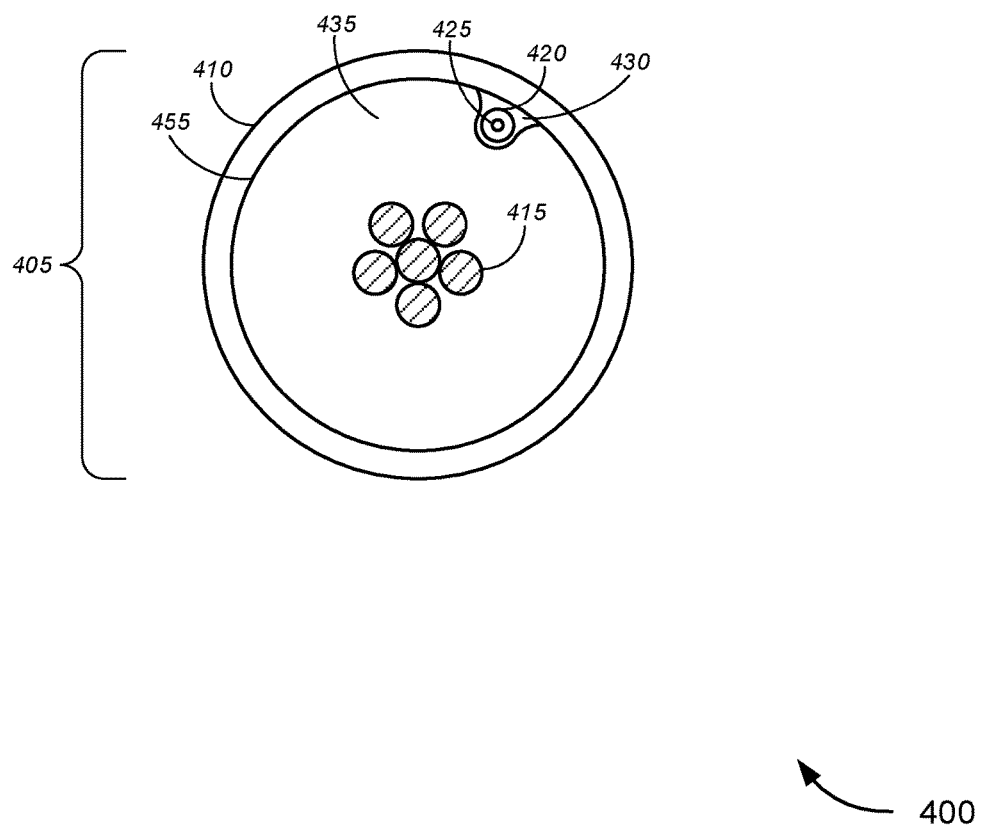
FIG. 4 is a cross-sectional view of an existing cable undergoing an alternative process for direct cable expansion, in accordance with various embodiments.

FIGS. 2-4 illustrate various cross-sectional views according to different configurations and modes of operations for the system 100. The various modes of operation of the system 100 are described with respect to the FIGS. 2-4.

FIG. 2A is a cross-sectional view 200A schematically illustrating the cable 105, 205 at line x-x of FIG. 1. The cross-sectional view 200A depicts the structure of the cable 205 before any channel is created within the cable 205. Accordingly, the cable 205 includes outer sheath 210, core 215, and interface 255 between the outer sheath 210 and core 215.

As shown, in some embodiments, the interface 255 may extend circumferentially around the entire core 215. In other embodiments, the core 215 may include a plurality wires, conductors, optical fibers, or other transmission lines. Thus, the interface 255 between the outer sheath 210 and core 215 may be irregular in shape. Accordingly, in some embodiments, the interface 255 may include areas where the outer sheath 210 and core 215 physically meet, and areas between the outer sheath 210 and core 215 in which the outer sheath 210 and core 215 are enlarged or separated to create the channel 250.

As previously described with respect to FIG. 1, the core 215 may include, without limitation, one or more transmission lines, such as various conductors, wires, and optical fibers, and innerducts. The core 215 may further include one or more types of transmission media located inside or otherwise housed by the outer sheath 210. Accordingly, the core 215 may include one or more transmission lines of one or more transmission media types. In various embodiments, the cable 205 and/or core 215 may further include, insulation, shielding, cladding, buffering, or other inner materials located adjacent to the interior of the outer sheath 210.

The outer sheath 210 may be a protective cover for the core 215, which may be constructed from materials such as rubber, thermoplastics such as polyvinyl chloride (PVC), polyurethane (PU), acrylonitrile butadiene styrene (ABS), polycarbonate (PC), polyethylene (PE), polypropylene (PP), or other plastics. The outer sheath 210 may be expandable utilizing, without limitation, heat, pressure, or physical deformation (e.g., stress, strain, stretching, etc.).

Accordingly, in the cross-sectional view 200A, the outer sheath 210 and core 215 are depicted in physical contact with one another, uniformly around the circumference of the core 215. Thus, the interface 255 likewise extends uniformly around the core 215. It is to be understood that cross-sectional view 200A is a schematic illustration that has been simplified for ease of description and should not be taken as limiting.

FIG. 2B is a cross-sectional view 200B schematically illustrating the cable 105, 205 at line y-y of FIG. 1. The cross-sectional view 200B depicts the structure of the cable 205 where a channel 230 is being created within the cable 205. Accordingly, the cross-sectional view 200B includes the cable 205, outer sheath 210, core 215, interface 255, probe 220, nozzle 225, and channel 230.

As described in FIG. 2A, the interface 255 may extend circumferentially around the core 215. Here, the probe 225 has been positioned to create the channel 230 at a desired section of the interface 255. In various embodiments, the channel 230 may be created via introduction of a fluid, at interface 255, through the nozzle 225. The fluid may then cause expansion between the outer sheath 210 and core 215 in immediate proximity to the nozzle 225. In some embodiments, the size of the channel 230 may be controlled, at least in part, by numerous factors, including, without limitation, an amount of fluid inside the channel 230, the fluid pressure built inside of the channel 230, the amount of pressure with which the fluid is expelled via the nozzle 225, the duration of time in which the probe 220 remains in a position before it is advanced and/or retracted, movement of the probe 220 and/or nozzle relative to the interface 255 (e.g., directing the fluid to different parts of the interface 255), nozzle 225 spray characteristics, mechanical operation of the probe 220, size of the probe 220 and/or nozzle 225, and the physical properties of the cable 205, outer sheath 210, or core 215, among other factors. Accordingly, a channel 230 of the desired size may be created by controlling the factors described above. The size of the channel 230 may refer to one or more of a cross sectional area of the channel 230, a total volume of the channel 230, a longitudinal length of the channel 230, or a diameter of the channel 230.

FIG. 3 is a cross-sectional view 300 schematically illustrating the cable 105, 305 at line y-y of FIG. 1, according to an alternative set of embodiments. Like FIG. 2B, the cross-sectional view 300 depicts the structure of the cable 305 where a channel 330 is being created within the cable 305. Accordingly, the cross-sectional view 300 includes the cable 305, outer sheath 310, core 315, probe 320, nozzle 325, and channel 330.

In the embodiments depicted, no interface is visible between the outer sheath 310 and core 315, as the channel 330 extends around the entirety of the core 315. The probe 325 may be create the channel 330 by introduction of the fluid into the cable 305. In some embodiments, the fluid may be introduced into the cable 305 from one or more positions, a range of positions corresponding to a portion of the interface between the outer sheath 310 and the core 315, or by movement of the probe 320 and/or nozzle 325 following the interface between the outer sheath 310 and the core 315. For example, in some embodiments, the probe 320 may create the channel 330 from a single position relative to the interface. In other embodiments, the probe 320 may be moved between a series of positions relative to the interface (e.g., a top position, bottom position, right position, left position). In further embodiments, the probe 320 may move back and forth within a defined range of positions relative to the interface (e.g., continuous movement within the range of positions), or may be moved to follow the interface around the entire core 315.

In various embodiments, because the channel 330 is formed around the entire core 315, the core 315 may be removed from the outer sheath 310. In some embodiments, the fluid may be a lubricant to aid in the extraction of at least part of the core 315 from the outer sheath 310. The extraction of core 315 may include extracting the entirety of the core 315, leaving behind only the outer sheath of the cable.

FIG. 4 is a cross-sectional view 400 of an existing cable 405 schematically illustrating an alternative process for direct cable expansion. As in FIGS. 2B-3, the cross-sectional view 400 is taken at line y-y of FIG. 1. As in FIGS. 2B-3, the cross-sectional view 400 includes cable 405, outer sheath 410, transmission lines 415, probe 420, nozzle 425, channel 430, and cladding 435.

In contrast with FIGS. 2B-3, here the core is illustrated as including a plurality of transmission lines 415 surrounded by cladding 435. Thus, the core of cable 405 includes both the plurality of transmission lines 415 and cladding 435. In various embodiments, the channel 430 is created, via the probe 420, within the cladding 435. Accordingly, in several embodiments, the fluid may be a solvent configured to dissolve at least part of the inner material of the cable 405 and/or core. In some embodiments, this may specifically include the cladding 435. For example, as previously described with respect to FIG. 1, the fluid may be introduced to the interface 455 between the outer sheath 410 and the core. In various embodiments, the fluid (e.g., solvent) may be configured to dissolve at least part of the cladding 435 without dissolving the outer sheath 410, or any of the plurality of transmission lines 415 within the core. Thus, in some embodiments, the channel 430 may be formed within the cladding material 435 of the core 115. In some further embodiments, the channel 430 may be formed separate from, or in combination with, expansion of the outer sheath 410 by the probe 420 via introduction of the fluid.

Figure 5:
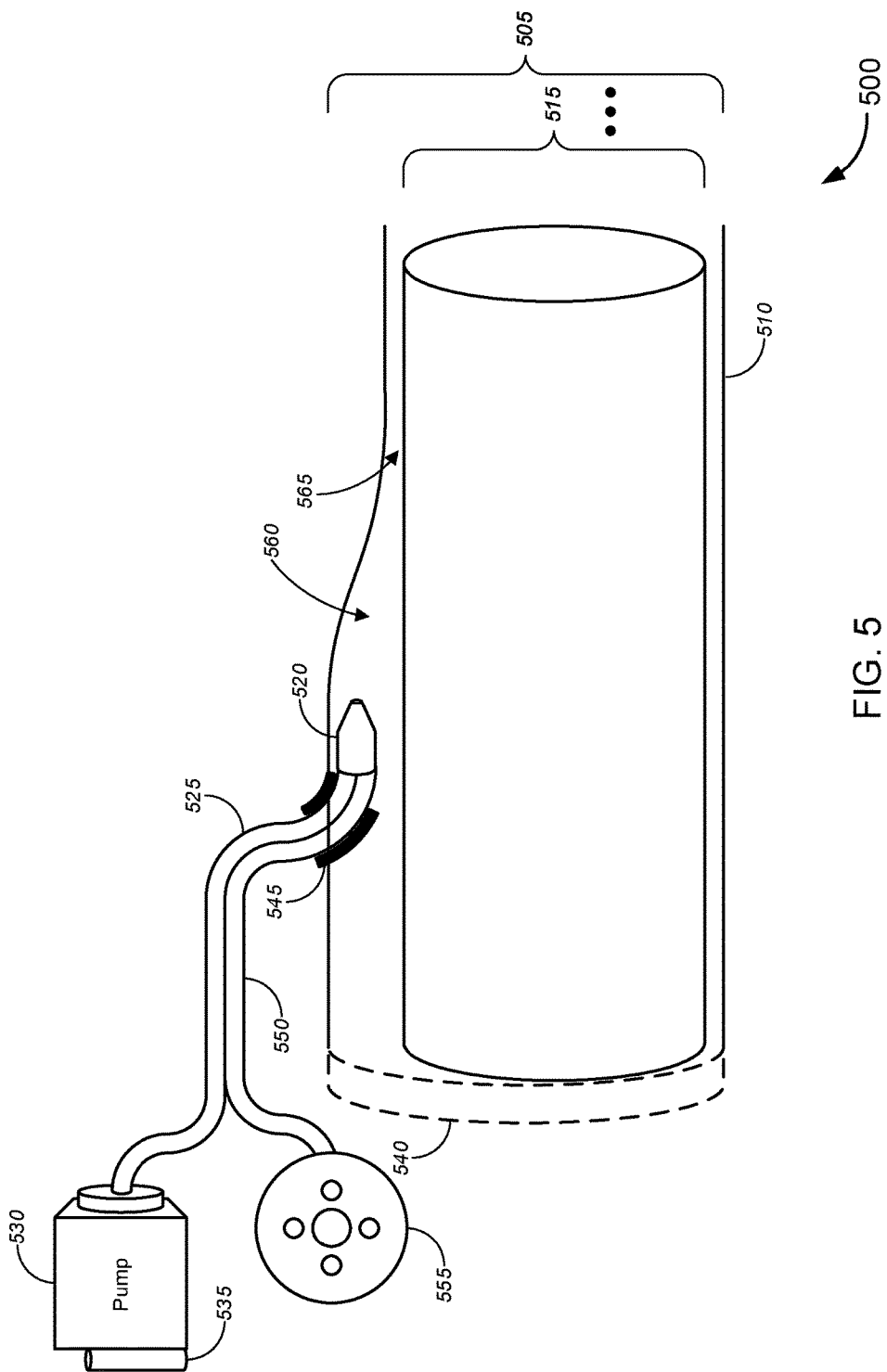
FIG. 5 is a schematic illustration of an alternative arrangement for a system for direct cable expansion, in accordance with various embodiments.

FIG. 5 is a schematic illustration of an alternative arrangement of a system 500 for direct cable expansion. In various embodiments, the system 500 includes a cable 505 with an outer sheath 510, and core 515, a probe 520, hose 525, pump 530, reservoir 535, endcap 540, coupler 545, new cable 550, spool 555, channel 560, and interface 565.

According to various embodiments, the coupler 545 may be coupled to the cable 505 via the outer sheath 510. The coupler 545 may be configured to allow the probe 520, hose 525, and new cable 550 to enter inside the cable 505. The probe 520 may be configured to create the channel 560 at an interface 565 between the outer sheath 510 and core 515. The probe 520 may be coupled to a pump 530 via the hose 525, and to a new cable 550. In some embodiments, the new cable 550 that may be extended and/or retracted via a spool 555. The pump 530 may be in fluid communication with reservoir 535. The pump 530 may include, without limitation, both pumps and/or compressors. Optionally, in some embodiments, endcap 540 may be operatively coupled to at least one end of the cable 505.

As previously described, with respect to FIG. 1, in various embodiments, cable 505 may include an outer sheath 510 and core 515. The outer sheath 510 of the cable 505 may act to hold together (e.g., house) one or more wires, conductors, optical fibers, or other transmission lines of the core 515. The core 515 may include one or more types of transmission lines of one or more transmission media types. In various embodiments, the core 515 may further include, in addition to the transmission lines, any associated insulation, shielding, cladding, buffering, or other materials located within the outer sheath 510. The outer sheath 510 may be expandable utilizing, without limitation, heat, pressure, or physical deformation (e.g., stress, strain, stretching, etc.), as caused by the probe 520. In various embodiments, the outer sheath 510 may be expandable from inside the cable 505, creating a channel 560 within the cable 505. The coupler 545 may further be configured to receive the probe 520, and to position the probe 520 at the interface 565 between the outer sheath 510 and the core 515. Like the coupler 145 of system 100, the coupler 545 of system 500 may include various types of connectors, attachments, couplers, valves, fittings, taps, or a combination of such components. In some embodiments, the coupler 545 may be configured to allow the probe 520, hose 525, and new cable 550 to advance into and retract out of the channel 560. In further embodiments, the coupler 545 may include guides to accommodate the movement of the hose 525 and the new cable 550, utilizing, for example, without limitation, one or more bearings (e.g., ball bearings, roller bearings, etc.), pulleys, or tracks. In some embodiments, the coupler 545 may include a respective guide for each of the hose 525 and new cable 550. Moreover, in some embodiments, the coupler 545 may include, without limitation, boots, guards, gaskets, grommets, or other mechanical seals for sealing in the fluid and to prevent dirt or other materials from entering the cable 505 via the coupler 545.

In various embodiments, the channel 560 may be formed to create spacing at the interface 565 between the outer sheath 510 and the core 515. As previously described, in some embodiments, the interface 565 may include anywhere the outer sheath 510 and core 515 meet, or any area between outer sheath 510 and core 515 that must be expanded to create the channel 560.

In various embodiments, the channel 560 may be created utilizing the probe 520 and pump 530, as described above with respect to the previous embodiments. However, in the alternative configuration of system 500, the probe 520 may further be configured to couple to the new cable 550, and move the new cable 550 into the channel 560, as the probe 520 creates and advances into the channel 560. In some embodiments, the probe 520 may include a connector to allow the new cable 550 both to attach to, and detach from, the probe 520. For example, after the new cable 550 has been placed in the desired positioned within the channel 560, the probe 520 may be configured to detach from the new cable 550. In some embodiments, the connector may also allow the hose 525 to be removably attached to the probe 520. In various embodiments, the connector of the probe 520 may include, without limitation, clamps, such as clamps (e.g., cable clamps, hose clamps, etc.), fittings (e.g., barb fittings, etc.), fasteners (e.g., cable fasteners, wire ties, etc.), hooks, and other suitable mechanisms.

In various embodiments, the new cable 550 may include one or more transmission lines, conduits, or sub-cables to be placed within the cable 505. For example, the new cable 550 may include, without limitation, one or more optical fiber cables, conduits, innerducts, copper cables, telephone cables, twisted pair cables, wires, conductors, optical fibers, or other types of transmission lines.

Figure 6:
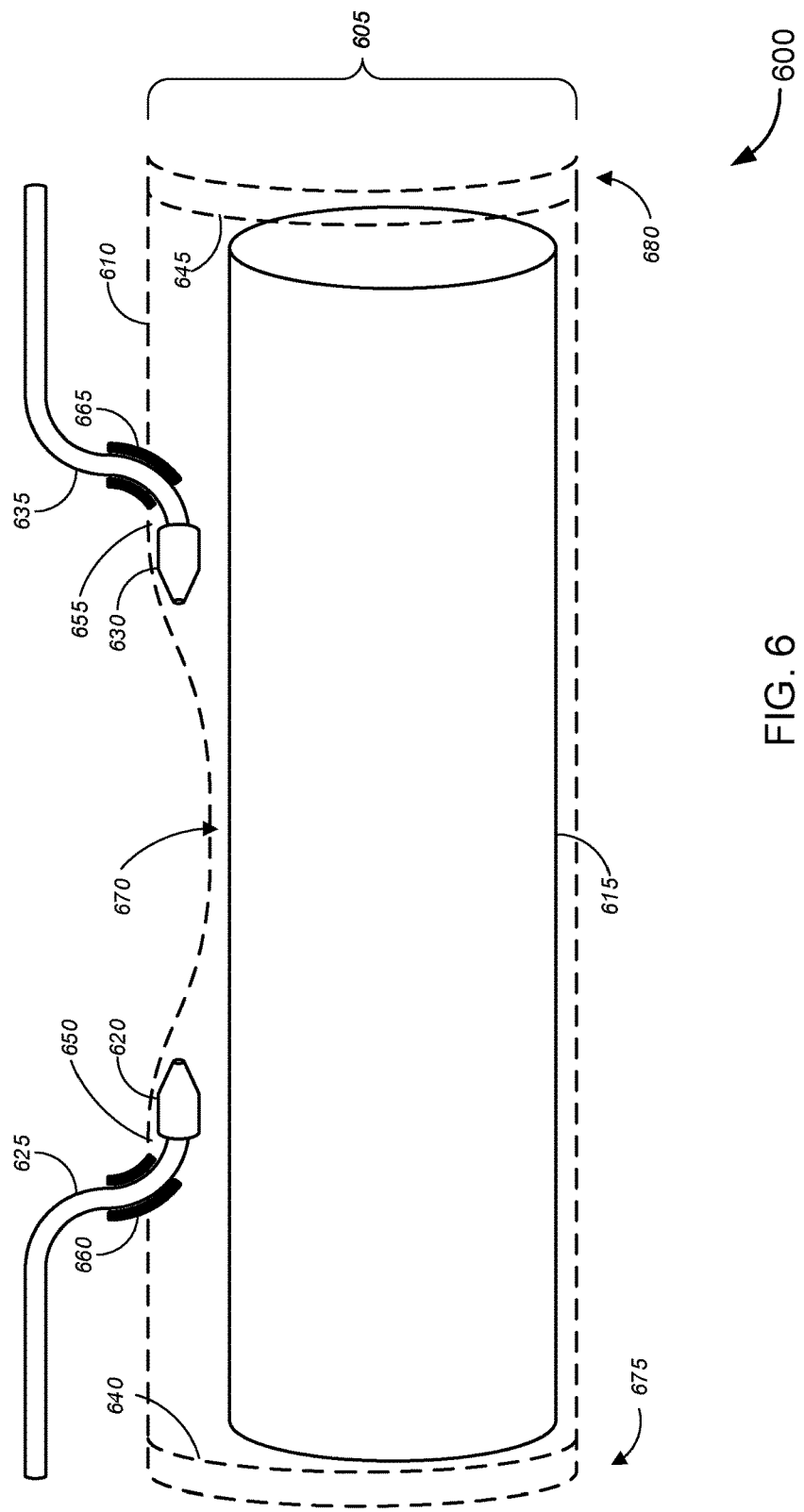
FIG. 6 is a schematic illustration of an alternative arrangement for a system for direct cable expansion, in accordance with various embodiments.

FIG. 6 is a schematic illustration of an alternative arrangement for a system 600 for direct cable expansion. According to various embodiments, the system 600 includes a cable 605 with an outer sheath 610, and core 615, a first probe 620 coupled to a pump via a first hose 625, a second probe 630 coupled to a pump via a second hose 635, optional first endcap 640, optional second endcap 645, a first channel 650, second channel 655, a first coupler 660, a second coupler 665, and an interface 670.

According to various embodiments, the first and second couplers 660, 665 may be configured to couple to the cable 605 through the outer sheath 610. The first coupler 660 may be configured to allow the first probe 620, first hose 625, and in some embodiments, optionally a new cable, to enter inside the cable 605 through the outer sheath 610. In some embodiments, the second coupler 665 may similarly be configured to allow the second probe 630 and second hose 635 to enter the cable 605 through outer sheath 610. The first probe 620 may be configured to create a first channel 650 at an interface 670 between the outer sheath 610 and core 615, starting at a first end 675 of the cable 605. In some embodiments, a second channel 655 may similarly be created via a second probe 630, starting at a second end 680 of the cable 605. Each of the first and second channels 650, 655 may be created, respectively, like in the embodiments described with respect to FIGS. 1 & 5. In various embodiments, each of the first and second probes 620, 630 may be coupled, respectively via first and second hoses 625, 635 to a respective pump, or may share a pump. Optionally, in some embodiments, first and second endcaps 640, 645 may be operatively coupled, respectively, to the first end 675 and second end 680 of the cable 605.

As previously described with respect to FIGS. 1 & 5, in various embodiments, cable 605 may include an outer sheath 610 and core 615. The outer sheath 610 of the cable 605 may act to hold together one or more wires, conductors, optical fibers, or other transmission lines of the core 615. The core 615 may include one or more types of transmission lines of one or more transmission media types. In various embodiments, the outer sheath 610 may be expandable from inside the cable 605, to create the first and second channels 650, 655 within the cable 605. The first and second channels 650, 655 may be formed concurrently, and may be expanded (e.g., lengthened) towards each other until the two channels 650, 655 are joined.

Alternatively, in some embodiments, the second coupler 665 may be configured to receive the first probe 620, from inside the cable 605. The second coupler 665 may allow the first probe 620 and first hose 625 to exit the cable 605. In further embodiments, the first probe 620 may further be coupled to a new cable, which the second coupler 665 may further be configured to allow to exit the cable 605. Accordingly, both the first coupler 660 and second coupler 665 may be configured to allow the first probe 620, first hose 625, and, in some embodiments, a new cable to advance into, retract out of, and eventually exit the cable 605 through the first or second channels 650, 655. The first and second couplers 660, 665 may include guides to accommodate the movement of the hose 625 and the new cable, utilizing, for example, without limitation, one or more bearings (e.g., ball bearings, roller bearings, etc.), pulleys, or tracks. Moreover, in some embodiments, the first and second couplers 660, 665 may include, without limitation, boots, guards, gaskets, grommets, or other mechanical seals for sealing in the fluid, and to prevent dirt or other materials from entering the cable 605.

While certain features and aspects have been described with respect to exemplary embodiments, one skilled in the art will recognize that numerous modifications are possible. For example, the methods and processes described herein may be implemented using different combinations of hardware components. Further, while various methods and processes described herein may be described with respect to structural and/or functional components for ease of description, methods provided by various embodiments are not limited to any specific structural and/or functional architecture, but instead can be implemented utilizing any suitable configuration or arrangement of parts. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
a pump, coupled to a reservoir holding a fluid, configured to pump the fluid; and
a probe, in fluid communication with the pump, configured to introduce the fluid into a cable such that a channel is created, by the fluid, between an outer sheath of the cable and a core of the cable;
a coupler configured to attach to the cable at a first end, receive the probe, and position the probe at an interface between the outer sheath and an inner material of the cable adjacent to the outer sheath.

2. The system of claim 1, wherein the probe is configured to traverse the cable longitudinally, within the channel as the channel is created.

3. The system of claim 1, wherein the pump is one of a pneumatic pump or compressor configured to pump gas.

4. The system of claim 1, wherein the pump is one of a hydraulic pump or compressor configured to pump liquid lubricant.

5. The system of claim 1, wherein the fluid is configured to dissolve at least part of the inner material, wherein the inner material surrounds the core.

6. The system of claim 1, wherein the probe is configured to pull a second cable through the channel.

7. The system of claim 1, wherein the attachment is further configured to create the channel circumferentially between the outer sheath and the core, wherein the channel allows the core to be removed from the outer sheath.

8. The system of claim 1, further comprising a second coupler configured to attach the cable at a second end.

9. The system of claim 1, wherein the probe further comprises a nozzle configured to direct the fluid.

10. An apparatus comprising:
a probe, in fluid communication with a pump, configured to introduce a fluid into a cable such that a channel is created, by the fluid, between an outer sheath of the cable and a core of the cable; and
a coupler configured to attach to the cable, receive the probe, and position the probe at an interface between the outer sheath and an inner material of the cable adjacent to the outer sheath.

11. The apparatus of claim 10, wherein the probe is configured to traverse the cable longitudinally, within the channel as the channel is created.

12. The apparatus of claim 10, wherein the fluid is configured to dissolve at least part of the inner material, wherein the inner material surrounds the core.

13. The apparatus of claim 10, wherein the probe is configured to pull a second cable through the channel.

14. The apparatus of claim 10, wherein the probe is further configured to create the channel circumferentially between the outer sheath and the core, wherein the channel is configured to allow the core to be removed from the outer sheath.

15. The apparatus of claim 10, wherein the probe further comprises a nozzle configured to direct the fluid.

16. A method comprising:
attaching a coupler to a cable;
receiving, via the coupler, a probe;
positioning, via the coupler, the probe at an interface between the outer sheath and an inner material of the cable adjacent to the outer sheath; and
introducing, via one of the coupler or the probe, fluid into the interface between the outer sheath and the inner material, wherein a channel is created by the fluid, between the outer sheath and a core within the cable.

17. The method of claim 16, further comprising:
traversing, with the probe, the cable longitudinally, within the channel as the channel is created.

18. The method of claim 16, further comprising:
directing, via the probe, fluid through an outlet of the probe; and
dissolving, with the fluid, at least part of the inner material, wherein the inner material surrounds the core.

19. The method of claim 16, further comprising:
pulling, with the probe, a second cable through the channel.

20. The method of claim 16, wherein the channel is created circumferentially, and further comprising:
removing the core from the outer sheath.

* * * * *